Figure 1:
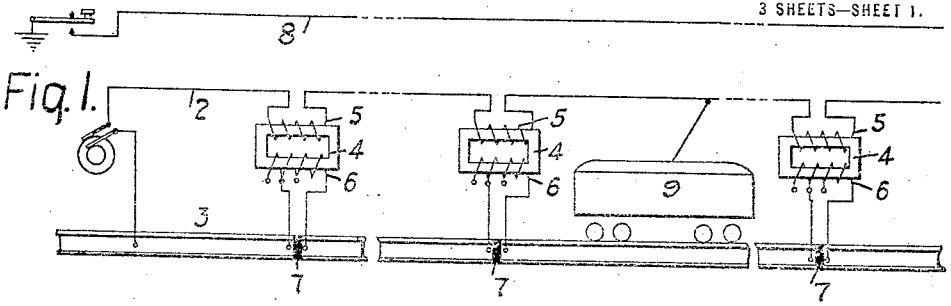

C. F. SCOTT.
MEANS FOR MINIMIZING INDUCTIVE INTERFERENCE.
APPLICATION FILED APR. 5, 1916.

1,293,945.

Patented Feb. 11, 1919.

3 SHEETS—SHEET 1.

WITNESSES:
R. J. Ridge.
Geo. W. Hansen.

INVENTOR
Charles F. Scott.

BY
Wesley G. Carr
ATTORNEY

C. F. SCOTT.
MEANS FOR MINIMIZING INDUCTIVE INTERFERENCE.
APPLICATION FILED APR. 5, 1916.
1,293,945.
Patented Feb. 11, 1919.
3 SHEETS—SHEET 3.
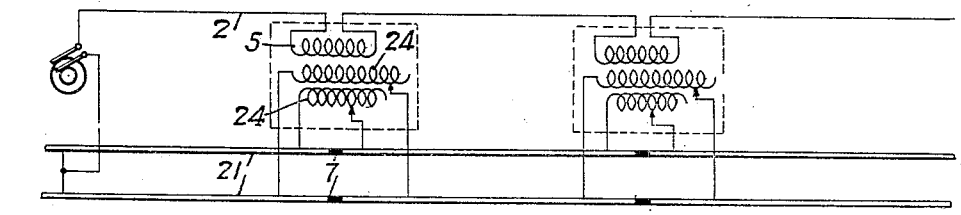
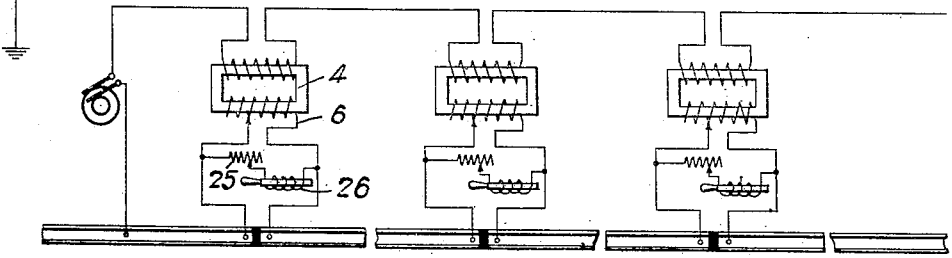
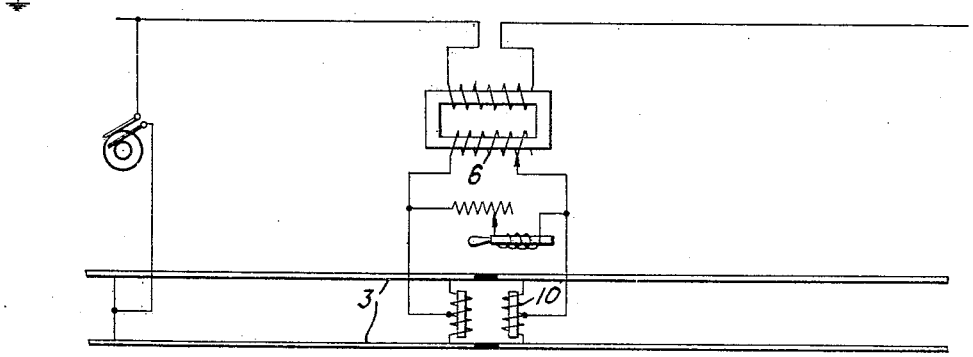
WITNESSES:
INVENTOR
Charles F. Scott.
BY
ATTORNEY

UNITED STATES PATENT OFFICE.

CHARLES F. SCOTT, OF NEW HAVEN, CONNECTICUT, ASSIGNOR TO WESTINGHOUSE ELECTRIC AND MANUFACTURING COMPANY, A CORPORATION OF PENNSYLVANIA.

MEANS FOR MINIMIZING INDUCTIVE INTERFERENCE.

1,293,945. Specification of Letters Patent. Patented Feb. 11, 1919.

Original application filed January 2, 1915, Serial No. 170. Divided and this application filed April 5, 1916. Serial No. 89,061.

*To all whom it may concern:*

Be it known that I, CHARLES F. SCOTT, a citizen of the United States, and a resident of New Haven, in the county of New Haven and State of Connecticut, have invented a new and useful Improvement in Means for Minimizing Inductive Interference, of which the following is a specification, this application being a division of application Serial No. 170, filed Jan. 2, 1915.

My invention relates to means whereby electric current flow may be substantially confined to certain conducting paths in preference to other paths which may be of low impedance, and which may be electrically connected in parallel relationship therewith.

More particularly, my invention relates to means whereby the return flow of trolley currents of a railway system may be substantially confined to the track rails in preference to ground or earth return. By reason of confining the return trolley current flow to the track rails, inductive disturbances imposed upon other electrical circuits, such as intelligence-transmission circuits which are located in proximity to the railway system, may be greatly minimized or substantially neutralized.

Inasmuch as the rails comprising tracks of railway systems are more or less in electrical contact with the earth, which is equivalent to a conductor of very low impedance, a considerably large portion of the return trolley currents will ordinarily flow in the earth. As a result, the inductive disturbances set up by the flow of power currents over the trolleys are given free play, because the return currents flowing through the earth are so remotely removed from the trolley currents that the inductive effects resulting from the trolley and earth return currents do not neutralize each other to any appreciable extent.

As it is well known, auxiliary conductors independent of the trolley conductor or the rails have been disposed adjacent to railway circuits or intelligence-transmission circuits in order to confine the inducing disturbances occasioned by the trolley currents or to neutralize and minimize the electromotive forces induced in the intelligence-transmission circuits. These results are effected, in the former instance, by confining the flow of the return trolley currents to independent auxiliary conductors which are disposed closely adjacent to the trolley conductors and are electrically connected to the tracks. In the latter instance, by subjecting the inductive auxiliary conductors to the same inductive influences that are imposed upon the intelligence-transmission conductors, the auxiliary conductors and the intelligence-transmission conductors being so interconnected, preferably by transformers, as to counterbalance or substantially neutralize, the electromotive forces induced therein.

Therefore, by means of my invention, the return flow of the trolley currents may be confined to the track rails or in regions of the earth which are closely adjacent to the track rails. In this manner, the zones of disturbing inductive influences arising from the return flow of the power currents are restricted, and such currents are confined to limited regions close to the trolley conductors. whereby the former may be used effectively to minimize or neutralize the disturbances occasioned by the latter.

Figure 2:
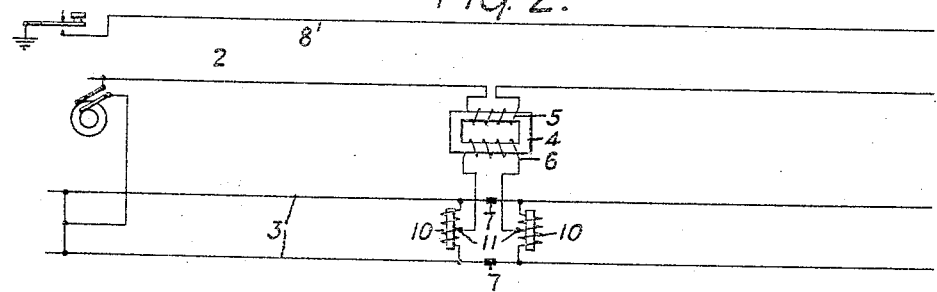
Figure 3:
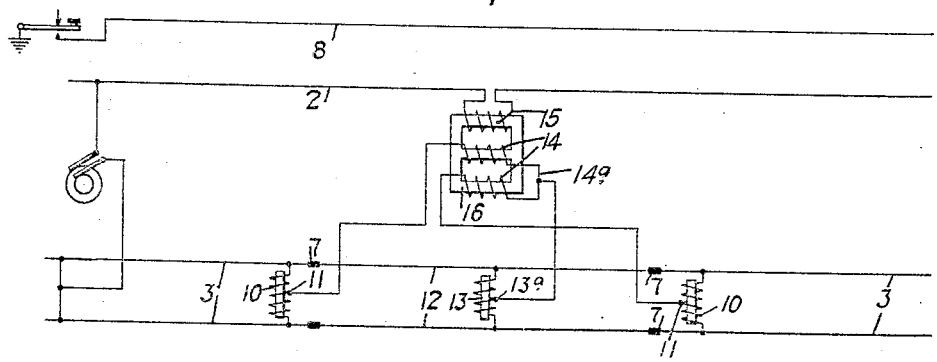
Figure 4:
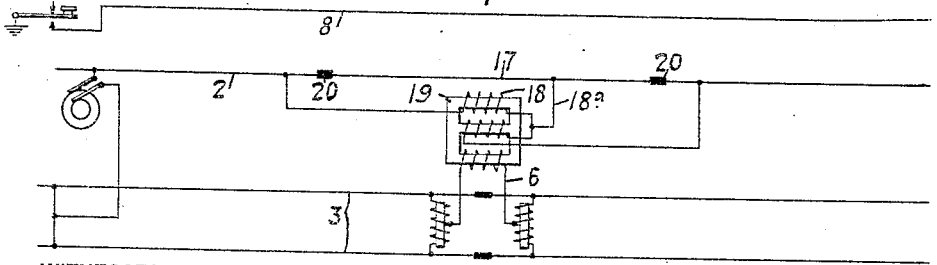
Figure 5:
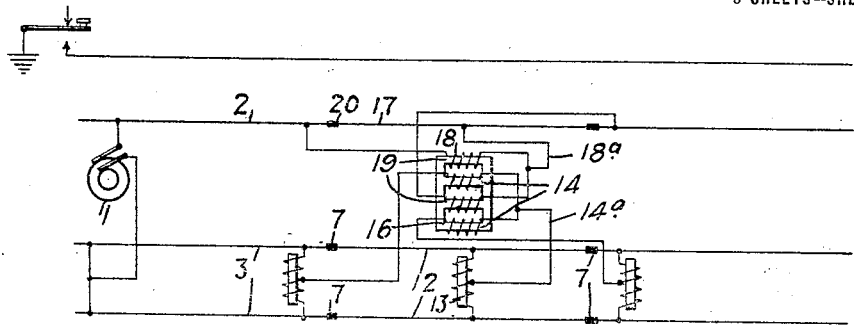
Figure 6:
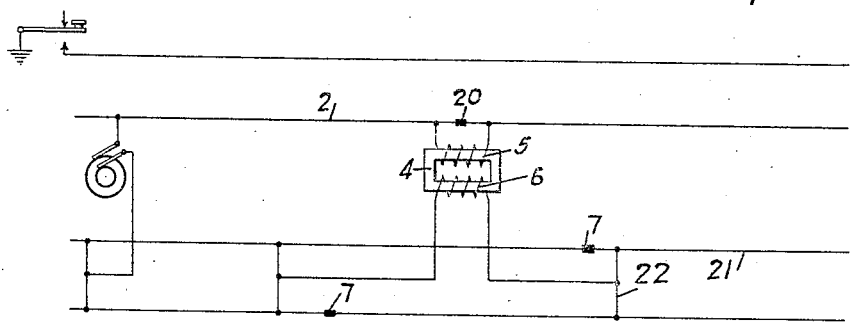
Figure 7:
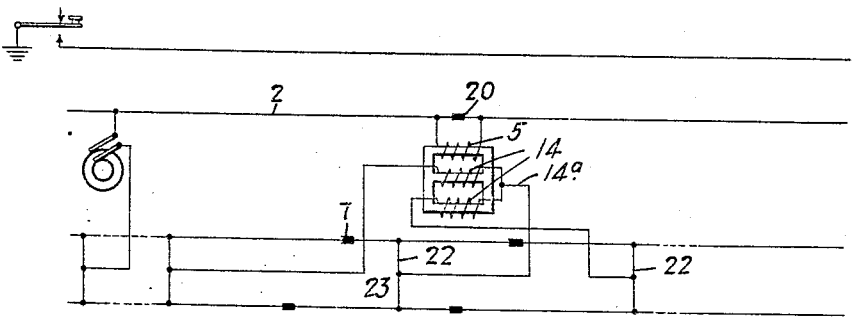

For a better understanding of the nature and the scope of my invention, reference may be had to the following description and the accompanying drawings in which Figure 1 is a schematic diagram showing an embodiment of my invention; Fig. 2 is a diagrammatic view of a system in which my invention is employed in connection with a track that comprises two rails and constitutes the return circuit for the trolley currents; Figs. 3, 4, and 5 are diagrammatic views, showing my invention applied to a railway system in which short track or trolley sections, or both, are interposed between the main portions of their respective circuits in order not to subject the insulating joints to excessive voltages; Figs. 6 and 7 are diagrammatic views of modifications of the systems shown in Figs. 2 and 3; Fig. 8 is a diagrammatic view of a railway system in which the two rails are insulated from each other and are connected inductively to the trolley circuit by independent secondary coils, and Figs. 9 and 10 are diagrammatic views of modified forms of the system shown in Figs. 1 and 2, respectively.

In a railway system, trolley currents return through the earth because of the difference of potential between that portion of the track near the vehicle, and that portion of the track near the substation where the power is generated. This difference of potential results from the relatively high impedance of rails which causes a difference of potential between various portions of the track when current traverses the same. If the return trolley current is wholly confined to the track and prevented from flowing through the earth, the electromotive forces induced in an intelligence-transmission conductor equally distant from the trolley and from the track, will be negligible because of the neutralization of the electromotive forces induced in the intelligence-transmission conductor by the trolley current and the current flowing over the track, respectively. The track is a natural path for the return flow of the trolley current, as it is of substantially low resistance and low impedance, and is available in all railway systems. By means of my invention, I propose to confine the flow of return trolley currents to the track by supplying compensating electromotive forces for overcoming the impedance offered by the track.

Referring to Fig. 1, a source of power supply 1, shown as a single-phase alternator, is connected through one of its terminals to a trolley conductor 2 and through another of its terminals to a rail 3 of a track. Ordinarily, the alternator will have one of its terminals grounded which electrically connects the alternator to the track which is in contact with the earth. A plurality of series transformers 4 are inserted at intervals along the railway system, as shown, primary windings 5 being connected in series-circuit relationship with the trolley conductor 2, and secondary windings 6 being connected to the rail 3 across insulating joints 7. The insulating joints 7 divide the track into a series of insulated sections. An intelligence-transmission conductor 8, shown as a telegraph conductor, is disposed adjacent to the trolley conductor 2 and the track 3 and is, therefore, under the inductive influences arising from the currents flowing over the aforementioned conductors. Ordinarily, when a moving vehicle 9 receives power from the trolley conductor 2, a considerable portion of the return trolley currents flow from the vehicle 9 through ground to the source of power supply 1 which has one of its terminals grounded. In my system, however, the return trolley currents traverse the rails 3. The electromotive forces for sending currents through the rails 3 are supplied by the series transformers 4, the secondary windings 6 of which, as before mentioned, are inserted at intervals in the track circuit. For example, if there is a total electromotive force of 200 volts required for sending the return trolley currents through the portions of the track rails intervening between the vehicle 9 and the source of power supply 1, the series transformers 4 inserted in this portion of the track will supply, in the aggregate, this required total electromotive force of 200 volts. If the above-mentioned portion of the track be four miles long and, if a series transformer 4 is inserted in each mile thereof, then each of the transformers will supply an electromotive force of 50 volts. As electromotive forces are thus impressed by transformers inserted in every mile of the track, there is a substantially uniform distribution of potentials along the track instead of a maximum difference of potential of 200 volts. As a result, the current flow in the earth will, in general, be for short distances only between the transformers.

The series transformers 4, when having primary and secondary windings of substantially equal numbers of turns, will insure a current flow through the track 3 of substantially equal value to that through the trolley 2 by reason of the well known relation between the ampere turns of the primary circuit and the ampere turns of the secondary circuit of a series transformer. Inasmuch as the return flow of the trolley currents is, under the aforementioned circumstances, confined to the track 3, which is disposed in proximity to the trolley 2, the inductive effects imposed upon the conductor 8 will be substantially neutralized. Of course, the total electromotive force drop in the railway system will be substantially the same as that which would occur if the transformers 4 were not inserted therein, because the primary windings 5 of the transformers 4 require certain voltages which are equal to those impressed by the secondary windings 6 upon the track rails.

If a signaling system is employed on a railway system, it may be necessary to provide inductive bonds connected between the two rails of the track and disposed adjacent to the insulating joints therein in order to create a suitable path for the currents used in operating the signals. In Fig. 2, I have shown inductive bonds 10 inserted at the sides of the insulating joints 7 which are disposed in the track circuit 3. The secondary winding 6 of the transformer 4 is connected to mid-points 11 of the windings of the inductive bonds 10. Inasmuch as equal quantities of return trolley currents will flow in opposite directions through the winding of each inductive bond 10, the impedance offered thereby will be negligible. In this instance, both rails 3 comprising the track constitute the path for the return flow of the trolley currents.

If the electromotive forces generated in the secondary windings of the transformers are excessive, the track may be provided with a short insulated section 12, as shown in Fig. 3. By this means, the electromotive force generated in the secondary winding of a transformer 15 is divided between two insulating joints 7. An inductive bond 13 is connected between the two rails 3 comprising the insulated section 12. The mid-point 14ᵃ of a double secondary winding 14 of the transformer 15 is connected to the mid-point 13ᵃ of the winding of the inductive bond 13. The terminals of the double secondary winding 14 are connected to the mid-points 11 of the inductive bonds 10. I have shown the transformer 15 provided with the double secondary winding 14, each coil being wound upon a separate magnetic core 16 which is connected in parallel with the magnetic core associated with the other secondary winding. The magnetic flux generated by the primary coil divides normally into two equal portions each of which flows through one of the magnetic cores 16. When a short circuit is imposed upon one of the secondary windings 14 by reason of the wheels of a passing vehicle momentarily bridging the insulating joints 7, the short circuit will not act upon the whole secondary winding but will be confined to the respective secondary coil which is thus short circuited, leaving the other secondary coil independent to impress an electromotive force upon the track circuit, as hereinbefore explained. Under these conditions, the electromotive force may be limited in amount by providing that the core of the transformer becomes saturated.

In Fig. 4, I have shown the trolley conductor 2 provided with a short insulated section 17 which corresponds to the insulated section 12 in the track of Fig. 3. In this instance, a primary winding 18 comprises two coils disposed on independent core members 19 and having their mid-point 18ᵃ connected to the short insulated trolley section 17. The terminals of the primary winding 18 are connected to the trolley 2 adjacent to insulating joints 20 inserted in the trolley. In this manner, the electromotive force of the primary winding 18 is impressed upon two insulating joints 20 which are connected in series relationship. The secondary winding 6 of the transformer is connected to the track circuit 3, as shown in a similar manner in Fig. 2. The primary winding 18 is divided into two coil sections wound on independent core members so that, when a short circuit occurs upon one of the coil sections as a result of the passing of the contact member of a moving vehicle, this short circuit will not be impressed upon the entire primary winding.

In Fig. 5, I have shown both the trolley 2 and the track rails 3 provided with short insulated sections 17 and 12, respectively. In this instance, both the primary winding 18 and the secondary winding 14 comprises double coil sections, each winding embracing independent core members 19 and 16, respectively. The mid-point 18ᵃ of the primary winding is connected to the insulated trolley section 17, as explained in Fig. 4, and the mid-point 14ᵃ of the secondary winding is connected to the mid-point of the winding of the inductive bond 13 inserted in the short insulated track section 12, as explained in connection with Fig. 3. I prefer to have alternate coils upon the transformer connected together, as shown in the drawing, in order that a transformer of an efficient design may be made. As previously explained in reference to Figs. 3 and 4, the terminals of the primary winding are connected to the trolley conductor 2 adjacent to the insulating joints 20, and the terminals of the secondary winding are connected to the track rails 3 adjacent to the insulating joints 7.

In Fig. 6, the two insulated joints 7 inserted in the rails 21 which comprise the track circuit are staggered, and conducting bonds 22 are inserted in order to connect electrically the two rails in parallel relationship. The terminals of the secondary winding 6 of the transformer 4 are connected to the bonds 22, as hereinbefore explained. As the contact member of a moving vehicle approaches an insulating joint 20 in the trolley conductor 2, and after one of the track insulating joints 7 has been passed by the vehicle, the two rails 21 will be connected electrically because of the electrical connection existing between a pair of wheels of the vehicle. The circuit thus established will continue until after the joint 20 in the trolley conductor has been passed by the contact member and the other joint 7 in the track circuit has been passed by the vehicle, when the connection between the two rails will be broken. At this instant, current will flow in both coils of the transformer 4, the trolley current flowing through the primary winding 5, and the return current flowing through the secondary winding 6. By thus insuring a substantially simultaneous flow of current through both windings of the transformer, the transformer is not subjected to abnormal magnetic saturation and resulting high voltage which would obtain if current flowed through only one coil for a short time.

If it is desired to distribute the voltages impressed upon the track rails over two or more insulating joints as explained in reference to Fig. 3, the system shown in Fig. 7 may be used, to which reference may now be had. The insulating joints 7 inserted in both rails of the track are staggered and provide a short insulated track section 23, the rails thereof being electrically connected to each other by the conducting bonds 22 which, in turn, is connected to the midpoint 14ᵃ of the double secondary winding 14 of the transformer. The terminals of the secondary winding 14 are connected to other conducting bonds 22 which are disposed outside of the short insulated track section 21. The primary winding 5 of the transformer is connected across the insulated joint 20 in the trolley conductor 2. Again, I prefer to dispose the coil sections of the secondary winding 14 on independent core members in order that the transformer shall not be rendered totally ineffective when one of the secondary coils is short circuited.

Of course, it will be understood that, in actual installations, the spacing and dispositioning of the insulating joints in both the trolley conductor and the track circuit utilized in the system above described, are dependent upon the design of the locomotives, such as the relative positions of the contact members and the tracks, and upon the signaling systems employed.

It may be necessary to maintain the two rails comprising a track independent of each other, as is sometimes required for signaling purposes. In Fig. 8, the two rails 21 are insulated from each other, independent secondary windings 24 being connected across insulating joints 7 inserted in each rail. Both independent secondary windings 24 are inductively related to the primary winding 5 which is connected in circuit with the trolley conductor 2. In order to adjust the quantity of return current flowing in each rail, each of the secondary windings 24 is provided with a plurality of adjustable taps, as shown in the drawing.

In installing my system for confining at least some of the return flow of trolley currents to the rails, it may be essential to provide a number of adjusting means to compensate for the irregular spacing of the intelligence-transmission conductor 8 relative to the railway system. For this reason the primary and secondary windings of the transformers, which interconnect the trolley conductor and the track circuit, respectively, may be provided with adjustable taps or with unequal numbers of turns so as to force a certain amount of the return trolley currents to flow through the earth in the nature of a secondary load, in addition to the magnetizing currents of the transformers. Since the ampere turns in the primary and secondary windings of the series transformers must be substantially equal under all conditions, the currents traversing the adjustable secondary windings and, consequently, the rails may be adjusted to suitable values by varying the active lengths of the secondary windings. Also, the resultant of the currents traversing the secondary windings and the ground must be equal in value to the currents traversing the trolley conductor since the two first mentioned paths for the power currents constitute the return circuit for the currents traversing the trolley conductor. Therefore, it is obvious that the value, as well as the direction of flow of the ground currents may be controlled, at will, by varying the relation between the turns of the primary and secondary windings of the transformers serving to inductively interlink the trolley conductor and the track. These earth currents may induce electromotive forces in either direction in the telegraph circuit 8, and hence may be utilized as one of the components for correcting or neutralizing certain other component electromotive forces which may be induced therein by reason of the unequal spacing of the telegraph circuit from the trolley conductor and the track circuit.

While a proper adjustment of the relative turns in the primary and secondary windings of the transformers may greatly reduce disturbing influences in the telegraph circuit 8 to insure more complete neutralization of the inductive disturbances, it may be desirable to adjust the phase of the return flow currents external of the secondary windings. This may be desirable when the series transformers are unequally spaced or the trolley conductor and rails are not uniformly disposed which results in causing the railway system to possess a varying inductive relation throughout its length with respect to the telephone or telegraph conductor.

To this end, the secondary windings 6 of Fig. 9, which windings are shown adjustable, are provided with artificial loads each comprising an adjustable resistor 25 and an adjustable inductance device 26 which, in this instance, are shown as being connected in series relationship across the active turns of each winding 6. The auxiliary circuit, comprising the resistor 25 and an inductor 26 corresponds to one component circuit, the other component circuit being the track and ground and the resultant circuit being the secondary winding. The phase and current conditions obtaining within the auxiliary circuits comprising the resistors 25 and the inductors 26 are responsible for regulating the phase and current conditions obtaining in the ground circuit.

While, in Fig. 9, I have shown the transformers 4 connected in circuit as previously explained in reference to Fig. 1, the secondary windings 6 of the transformer 4 may be connected to the track rails 3 by means of inductive bonds 10, as shown in Fig. 10. In this instance, artificial loads are provided for the adjustable secondary windings, 6, as explained in reference to Fig. 9.

From the foregoing, it will be apparent that transformers may be employed in a railway system which have various ratios between the turns of the primary and secondary windings for the purpose of controlling locally the amount of earth currents and the resulting induction in adjacent intelligence-transmission circuits when the latter vary in their position with respect to the railway system.

While I have shown and described in detail several embodiments of my invention, it will be understood by those skilled in the art that many modifications may be made without departing from the spirit and scope of the appended claims.

I claim as my invention:

1. A railway system comprising a source of current supply, a trolley conductor connected thereto, a track conductor comprising a rail in contact with the earth, means serving to impress electromotive forces at intervals on the track, and means serving to adjust the relative amounts of current flow through the track and the earth.

2. A system of electrical distribution comprising a source of current supply, a conductor insulated from the ground and connected to said source, a second conductor in contact with the earth, means associated with said first conductor to compensate for the voltage drop resulting from the impedance of said second conductor, and means serving to adjust the relative amounts of current flow through said second conductor and the earth.

3. A railway system comprising a source of current supply, a trolley conductor, a track in contact with the earth, a plurality of spaced insulating joints inserted in the track, transformers inductively interlinking the trolley conductor and the track, windings on the transformers being connected to the track across said insulating joints and other windings on the transformers being connected, at corresponding points, in series-circuit relationship with the trolley conductor, and means for fixing the relative amounts of current flow through the track circuit and through the earth.

4. A railway system comprising a source of current supply, a trolley conductor, a track in contact with the earth and having a plurality of insulated rail sections, and a plurality of transformers inductively interlinking the trolley conductor and the track, the primary windings of the transformers being inserted at intervals in series circuit with the trolley conductor and the secondary windings being connected to adjacent insulated track sections, and adjustable taps upon said secondary windings to fix the relative amounts of current flow through the track circuit and through the earth.

5. A railway system comprising a source of current supply, a trolley conductor connected thereto, a track comprising a rail in contact with the earth, means serving to impress the electromotive forces at intervals on the track, means serving to adjust the relative amounts of current flow through the track and the earth, and means serving to adjust the phase of the current flowing through the earth.

6. A system of electrical distribution comprising a source of current supply, a conductor insulated from the ground for the transmission of power currents, a second conductor in contact with the earth, means serving to adjust the relative amounts of current flow through said second conductor and the earth, and means serving to adjust the phase of the current flowing through the earth.

7. A system of electrical distribution comprising a source of current supply, a conductor insulated from the ground and connected to said source, a second conductor in contact with the earth, means associated with said first conductor to compensate for the voltage drop resulting from the impedance of said second conductor, means serving to adjust the relative amounts of current flow through said second conductor and the earth, and means serving to adjust the phase of the current flowing through the earth.

8. A railway system comprising a source of current supply, a trolley conductor, a track in contact with the earth, a plurality of spaced insulating joints inserted in the track, transformers inductively interlinking the trolley conductor and the track, primary windings of the transformers being connected at spaced intervals in series-circuit relationship with the trolley conductor and secondary windings being connected to the track across said insulating joints, and means associated with said secondary windings to adjust the phase of the current flowing through the earth.

9. A railway system comprising a source of current supply, a trolley conductor, a track in contact with the earth, a plurality of spaced insulating joints inserted in the track, transformers inductively interlinking the trolley conductor and the track, primary windings of the transformers being connected at spaced intervals in series-circuit relationship with the trolley conductor, and secondary windings being connected to the track circuit across said insulating joints, means serving to regulate the relative amounts of current flow through the track circuit and through the earth, and means associated with said secondary windings to adjust the phase of the current flowing through the earth.

10. A railway system comprising a source of current supply, a trolley conductor, a track in contact with the earth, a plurality of spaced insulating joints inserted in the track, transformers inductively interlinking the trolley conductor and the track, primary windings of the transformers being connected at spaced intervals in series-circuit relationship with the trolley conductor, and secondary windings being connected to the track across said insulating joints, and artificial loads for the secondary windings comprising impedance devices in order to adjust the phase of the current flowing through the earth.

11. A railway system comprising a source of current supply, a trolley conductor, a track in contact with the earth, a plurality of spaced insulating joints inserted in the track, transformers inductively interlinking the trolley conductor and the track, primary windings of the transformers being connected at spaced intervals in series-circuit relationship with the trolley conductor, and secondary windings being connected to the track across said insulating joints, and an artificial load comprising an adjustable impedance device connected across each secondary winding in order to adjust the phase of the current flowing through the earth.

In testimony whereof, I have hereunto subscribed my name this 27th day of March, 1916.

CHARLES F. SCOTT.